(12) United States Patent
Kanai et al.

(10) Patent No.: US 7,774,605 B2
(45) Date of Patent: *Aug. 10, 2010

(54) DIGITAL MEASUREMENT APPARATUS AND IMAGE MEASUREMENT APPARATUS

(75) Inventors: Yoichi Kanai, Kanagawa (JP); Masuyoshi Yachida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1322 days.

This patent is subject to a terminal disclaimer.

(21) Appl. No.: 11/082,889

(22) Filed: Mar. 18, 2005

(65) Prior Publication Data

US 2005/0166044 A1 Jul. 28, 2005

Related U.S. Application Data

(63) Continuation of application No. 09/442,056, filed on Nov. 16, 1999, now Pat. No. 6,889,324.

(30) Foreign Application Priority Data

Nov. 17, 1998 (JP) .................................. 10-326215
Jul. 21, 1999 (JP) .................................. 11-205709

(51) Int. Cl.
    *H04L 29/06* (2006.01)
(52) U.S. Cl. ........................................ 713/176; 713/180
(58) Field of Classification Search ................. 713/160, 713/161, 176–180
    See application file for complete search history.

(56) References Cited

U.S. PATENT DOCUMENTS 5,499,294 A * 3/1996 Friedman .................... 713/179
5,768,389 A 6/1998 Ishii
5,801,856 A * 9/1998 Moghadam et al. ......... 358/527
5,898,779 A * 4/1999 Squilla et al. ............... 713/176
6,005,936 A 12/1999 Shimizu et al.

(Continued)

FOREIGN PATENT DOCUMENTS

JP 9-6236 1/1997
JP 10-133956 5/1998

(Continued)

OTHER PUBLICATIONS

Gary. L. Friedman, "The Trustworthy Digital Camera: Restoring Credibility to the Photographic Image", IEEE Transactions on Consumer Electronics, vol. 39, No. 4, Nov. 1993, pp. 905-910.

(Continued)

*Primary Examiner*—Kimyen Vu
*Assistant Examiner*—Randal D Moran
(74) *Attorney, Agent, or Firm*—Oblon, Spivak, McClelland, Maier & Neustadt, L.L.P.

(57) ABSTRACT

A digital measurement apparatus measures a physical measurement object, provides a digital signature of public-key cryptography to measured data of a thus-measured physical quantity, and manages the measured data. The apparatus generates at least a pair of a public key and a private key, to be used for the digital signature of the public-key cryptography, through a key generating algorithm.

19 Claims, 8 Drawing Sheets

U.S. PATENT DOCUMENTS

| | | | |
|---|---|---|---|
| 6,246,967 B1 * | 6/2001 | Libicki et al. | 702/101 |
| 6,269,446 B1 * | 7/2001 | Schumacher et al. | 713/176 |
| 6,889,324 B1 * | 5/2005 | Kanai et al. | 713/176 |

FOREIGN PATENT DOCUMENTS

| | | |
|---|---|---|
| JP | 10-164549 | 6/1998 |
| JP | 2000-56681 | 2/2000 |

OTHER PUBLICATIONS

"Answers to Frequently Asked Questions About Today's Cryptography", RSA Laboratories, Cryptographic Research and Consultation, Version 3 pp. 1-204.

U.S. Appl. No. 11/624,447, filed Jan. 18, 2007, Kanai.

U.S. Appl. No. 11/082,878, filed Mar. 18, 2005, Kanai et al.

\* cited by examiner

DIGITAL MEASUREMENT APPARATUS AND IMAGE MEASUREMENT APPARATUS

CROSS-REFERENCE TO RELATED APPLICATIONS

This application is a continuation of U.S. patent application Ser. No. 9/442,056, filed Nov. 16, 1999, and in turn claims priority to Japan Patent 10-326215, filed Nov. 17, 1998, and Japan Patent 11-205709, filed Jul. 21, 1999 the entire contents of each of which are hereby incorporated herein by reference.

BACKGROUND OF THE INVENTION

1. Field of the Invention

The present invention generally relates to a digital measurement apparatus and an image measurement apparatus, and, in detail, to data security of an apparatus which converts an input obtained through a digital camera, a sensor, a FAX (modem) or the like into digital data, and performs processing such as management, transmission or the like on the digital data.

2. Description of the Related Art

Recently, conversion of information into electronic data has been rapidly progressing. This information, as electronic data, has been transmitted via a network or a portable medium, and various techniques have been developed for securing the electronic data. The electronic-data security techniques generally studied include a data concealment technique, a data-falsification detecting technique, a technique for management (including authentication) of access right to data, and so forth, in which techniques data is treated as merely a batch and the contents of the data are not aimed at. Techniques concerning whether or not the contents of the electronic data are correct have not been aggressively developed. However, when original data to be secured is wrong, there is no sense in securing the data. In the related art, when original data is generated electronically, processing such as addition of a digital signature of a person who produced the data or a person who has responsibility for the data may be performed in order to guarantee that the contents of the data are correct.

U.S. Pat. No. 5,499,294 (Friedman) and 'The Trustworthy Digital Camera: Restoring Credibility of the Photographic image' of Friedman., IEEE Transaction on Consumer Electronics, Vol. 39, No. 4, November 1993 disclose a method in which a private key unique to a digital camera is stored in the digital camera, the private key is used for calculating a digital signature for an image file taken by the digital camera, and the calculated digital signature is stored in a medium together with the image file. In detail, the private key stored in the digital camera is recorded in a ROM in a secure processor in the digital camera, and cannot be read externally. Further, a public key corresponding to the private key is put as a seal on the housing of the digital camera. Furthermore, the public key and parameters indicating the photography situation and so forth are arranged on the periphery of an image taken by the digital camera, and the digital signature is put on the thus-obtained entire image. Thereby, the credibility (ability to be used as evidence) of the image taken by the digital camera is improved. It is supposed that the public key corresponding to the digital camera is made wide open to the public by the manufacturer of the digital camera.

However, according to the above-described prior art, because the image file and the digital-signature file calculated by the digital camera are separate, there is a possibility that relationship between them becomes unrecognizable when these files are moved to a personal computer or the like. Therefore, although the processing for improving the credibility of the image file was performed, it cannot be recognized which digital signature corresponds to the image file, and, thereby, it becomes impossible to verify the integrity of the image file.

Further, in this prior art, a pair of a private key and a public key is generated by the manufacturer of the digital camera, and is recorded inside of the digital camera. However, the fact that the manufacturer of the digital camera-knows the private key results in degradation of the credibility of the image file.

Further, in this prior art, after a timer built in the digital camera is set at the time of manufacture, the setting cannot be changed. However, there is a possibility that the timer gradually gains or loses time. It is problematic that the time indicated by the timer cannot be set again to the correct one. Further, when the lithium battery of the timer goes dead, it is not possible to record the time.

Further, in this prior art, the manufacturer is supposed to open to the public all the public keys assigned for particular digital cameras. However, when a very large number of digital cameras are manufactured, to open to the public the same number of public keys is troublesome. Further, it is necessary to locate a corresponding public key from a huge public-key list when the integrity of an image is to be verified.

Further, because this prior art relates to digital cameras, which are digital apparatuses for general users, matters such as that who recorded data and so forth have not been considered. For example, especially in a case of a medical measurement apparatus such as a CT (Computed Tomography) apparatus or a digital endoscope, it may be important who measured (took) data.

Further, because this prior art relates to digital cameras which are comparatively inexpensive digital apparatuses for general users and have a short life cycle, matters concerning addition/replacement of the digital-signature algorithm inside of each digital camera and updating of the keys have not been considered. Merely it is disclosed that a new algorithm is loaded in a new product model. However, for example, in a case of an expensive digital medical apparatus such as a CT apparatus, the life cycle thereof is long, and there is a possibility that, over time, the strength of the encryption algorithm may be weakened, that is, the possibility that a code generated using the encryption algorithm is deciphered dishonestly increases in a period shorter than the life of the apparatus.

SUMMARY OF THE INVENTION

The present invention has been devised for solving these problems, and an object of the present invention is to provide a digital measurement apparatus and an image measurement apparatus by which the reliability and credibility of the contents of electronic digital data can be improved.

In order to solve the above-described problems, a digital measurement apparatus, according to the present invention, which apparatus measures a physical measurement object, provides a digital signature of public-key cryptography to measured data of a thus-measured physical quantity, and manages the measured data, comprises key generating means for generating at least a pair of a public key and a private key, to be used for the digital signature of the public-key cryptography, through a key generating algorithm.

Thereby, even the manufacturer of the apparatus cannot know the generated private key.

Further, as a result of the digital measurement apparatus recording the digital signature calculated for the measured data using the private key together with the measured data in a recording medium and as a result of the digital measurement apparatus storing therein a public-key certificate externally produced for the public key which is a companion to the private key, it is not necessary to make wide open to the public the public key of the particular measurement apparatus, but it is only necessary that the public key which is a companion to the private key used for producing the public-key certificate is made wide open to the public.

Further, as a result of the digital measurement apparatus having a sequence number, which indicates the order (sequence) in which the measured data is obtained, and recording the sequence number together with the measured data, it is possible to prevent the order (sequence) of the measured data from being confused.

Further, as a result of the digital measurement apparatus having at least one external authentication code, updating of the key generating algorithm, the pair of the public key and the private key and the sequence number may be enabled when external authentication corresponding to the external authentication code is established. Thereby, it is possible to maintain the credibility of the signed measured data produced by the digital measurement apparatus for a long period of time.

Further, an image measurement apparatus, according to the present invention has a characteristic quantity of an image as a portion of appurtenant information of an image-data format, calculates a digital signature from the image appurtenant information using a private key of the apparatus, and additionally stores the calculated digital signature in the image-data format as image appurtenant information. Thus, as a result of the digital signature being embedded in the image obtained through the image measurement apparatus, it is possible to verify whether or not the image was altered. However, when the digital signature is stored in the digital image, the digital image itself may change due to storing the digital signature. Further, it is not possible to add image appurtenant information later. In order to avoid such a situation, it is made clear which image appurtenant information is used for calculating the digital signature. Thereby, it is possible to change and/or add comments to portions of the appurtenant information, which portions are not useful for improving the credibility of the image, and, therefore, were not used for calculating the digital signature.

Other objects and further features of the present invention will become more apparent from the following detailed description when read in conjunction with the accompanying drawings.

DETAILED DESCRIPTION OF THE PREFERED EMBODIMENTS

Embodiments of the present invention will be described based on drawings.

First, the contents of electronic data, in particular, measured data of a physical quantity, to be handled by the present invention, are, specifically, for example, image data taken by a digital camera, reconstructed image data measured and calculated by a CT (Computed Tomography) apparatus, and so forth. Electronic data, such as the above-mentioned data, which is obtained as a result of processing (compression processing, tone-converting processing, and so forth in a case of the digital camera, and image reconstructing processing in accordance with the FBP (Filtered Back Projection) method in a case of the CT apparatus) unique to each device/apparatus being performed on the measured data, wherein a relationship of the electric data with the measured physical quantity is guaranteed, is data to be handled by the present invention. Such data which is guaranteed to be correct data, when the data is handed or shown to another person. Further, devices/apparatuses such as a digital camera, a CT apparatus and so forth, which are not generally called measurement apparatuses, are called 'digital measurement apparatuses' due to the above-described background.

Figure 1:
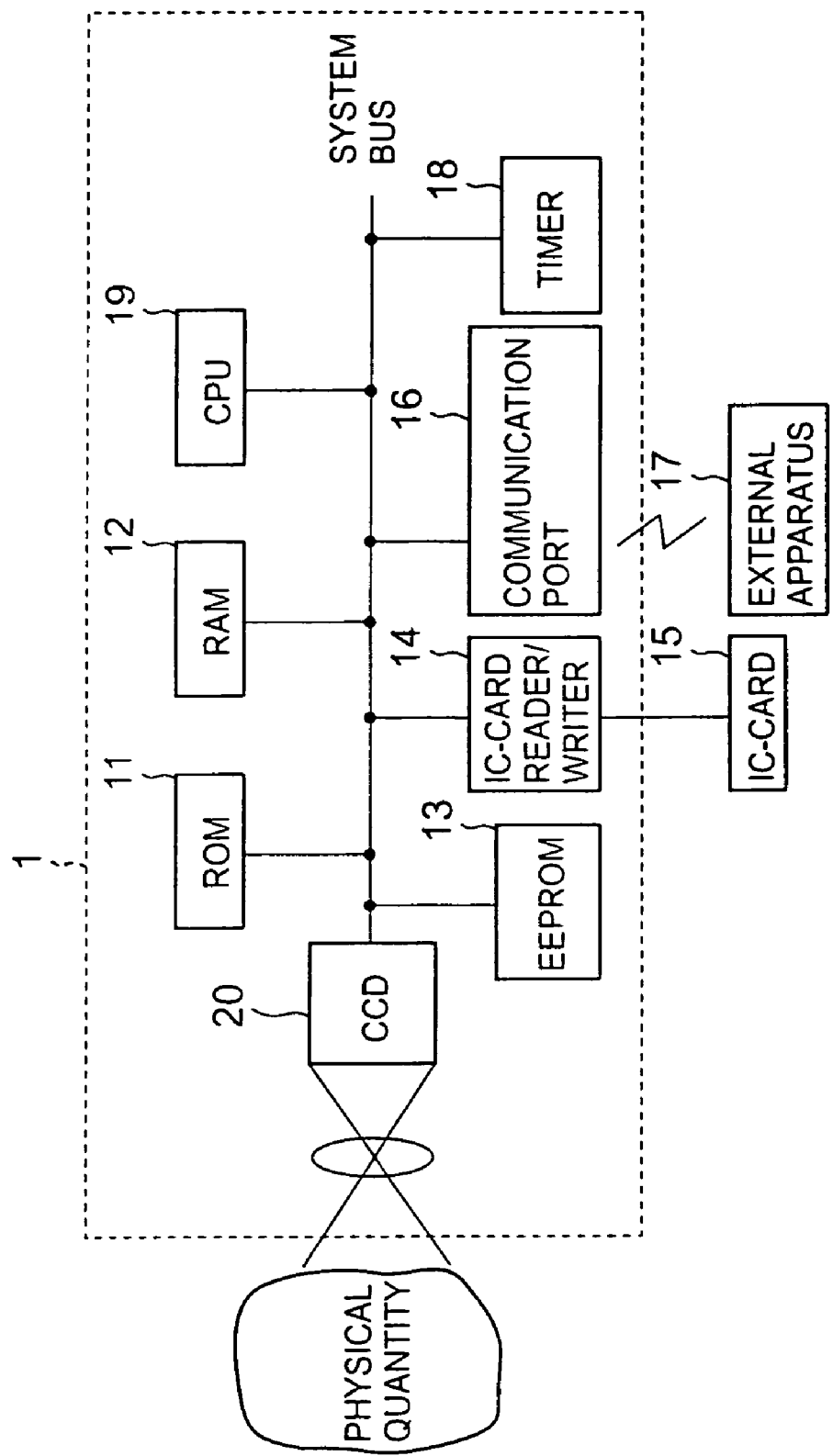
FIG. 1 is a block diagram showing a general arrangement of a digital measurement apparatus in a first embodiment of the present invention.

FIG. 1 is a block diagram showing an arrangement of a digital measurement apparatus in a first embodiment of the present invention. A digital camera will now be described as an example of the digital measurement apparatus in the first embodiment. The digital camera 1 in the first embodiment shown in FIG. 1 includes a ROM 11 in which an encryption algorithm (for example, RSA or the like) and a hash algorithm (for example, MD5 or the like) for a digital signature, an encryption algorithm (for example, DES (Data Encryption Standard), which is an encryption algorithm of secret-key cryptography (However, an encryption algorithm of any system may be used, as long as it can be used for external authentication.)) for the external authentication, an image-data compressing algorithm (for example, JPEG), a random-number generating algorithm and a main control program are stored. The digital camera 1 in the first embodiment shown in FIG. 1 also includes a RAM 12 in which the main control program, the various algorithms, a private key, a sequence number, an external authentication key and/or the like are loaded as the need arises. The digital camera 1 in the first embodiment shown in FIG. 1 also includes an EEPROM 13 in which the private key used for the digital signature in the public-key cryptography, a public-key certificate (a signature of a certification authority and a public key), the sequence number and the external authentication key are stored. The digital camera 1 in the first embodiment shown in FIG. 1 also includes an IC-card reader/writer 14 which performs reading information from and writing information to a plurality of IC cards 15, at the same time, such as a memory card, a smart media, a memory stick and/or the like (such various types of cards for storing images being generally called 'IC cards') in which digital image information obtained as a result of the sequence number, time, digital signature and so forth being added to obtained digital photograph image data is stored. The digital camera 1 in the first embodiment shown in FIG. 1 also includes a communication port 16 for conducting correspondence with an external apparatus 17 through communication, a timer for obtaining time data, a CPU 19 which performs various calculations and controls the various components, and a CCD 20 which converts an obtained image into electronic data.

An operation of the digital camera 1 in the first embodiment will now be described. When a shutter button (not shown in the figure) is pressed, the CPU 19 obtains time data from the timer 18 and stores it in the RAM 12, and, simultaneously, obtains photograph image data from the CCD 20 and stores it in the RAM 12. Then, the CPU 19 compresses the stored image data. Further, the CPU 19 reads the sequence number from the EEPROM 13, and, simultaneously, stores in the EEPROM 13 the sequence number obtained as a result of 1 being added to the read sequence number. The CPU 19 adds the previously read sequence number and the time data obtained from the timer 18 to the top of the compressed image data. Then, the digital signature is added to the thus-produced image data, and the thus-obtained information is stored in the IC card 15 as photograph information as a batch. External authentication processing which should be previously performed when the private key, public-key certificate, sequence number or time setting is changed is performed in the following procedure in a case where, for example, DES is used as the algorithm for the external authentication.

The CPU 19 generates a random number, and sends it to the external apparatus 17. The external apparatus 17 receives the random number and converts (for example, encrypts) it into an authentication code and sends it to the digital camera 1. The CPU 19 of the digital camera 1 receives the authentication code, and compares it with a code obtained as a result of the previously generated random number being encrypted using the external authentication key of the digital camera 1. When these codes agree with one another, it is determined that the external authentication has been established. Then, a security status (a flag, managed in the RAM 12 of the digital camera 1, the initial state of which is FALSE) is changed into TRUE. When change of the private key, public-key certificate, sequence number, or time setting is requested externally, the security status managed inside of the digital camera 1 is referred to. Then, when the security status is FALSE, the request is not accepted. On the other hand, when the security status is TRUE, the request is accepted, and processing in accordance with the request is performed. When the processing is completed, the security status is changed to FALSE.

Figure 2:
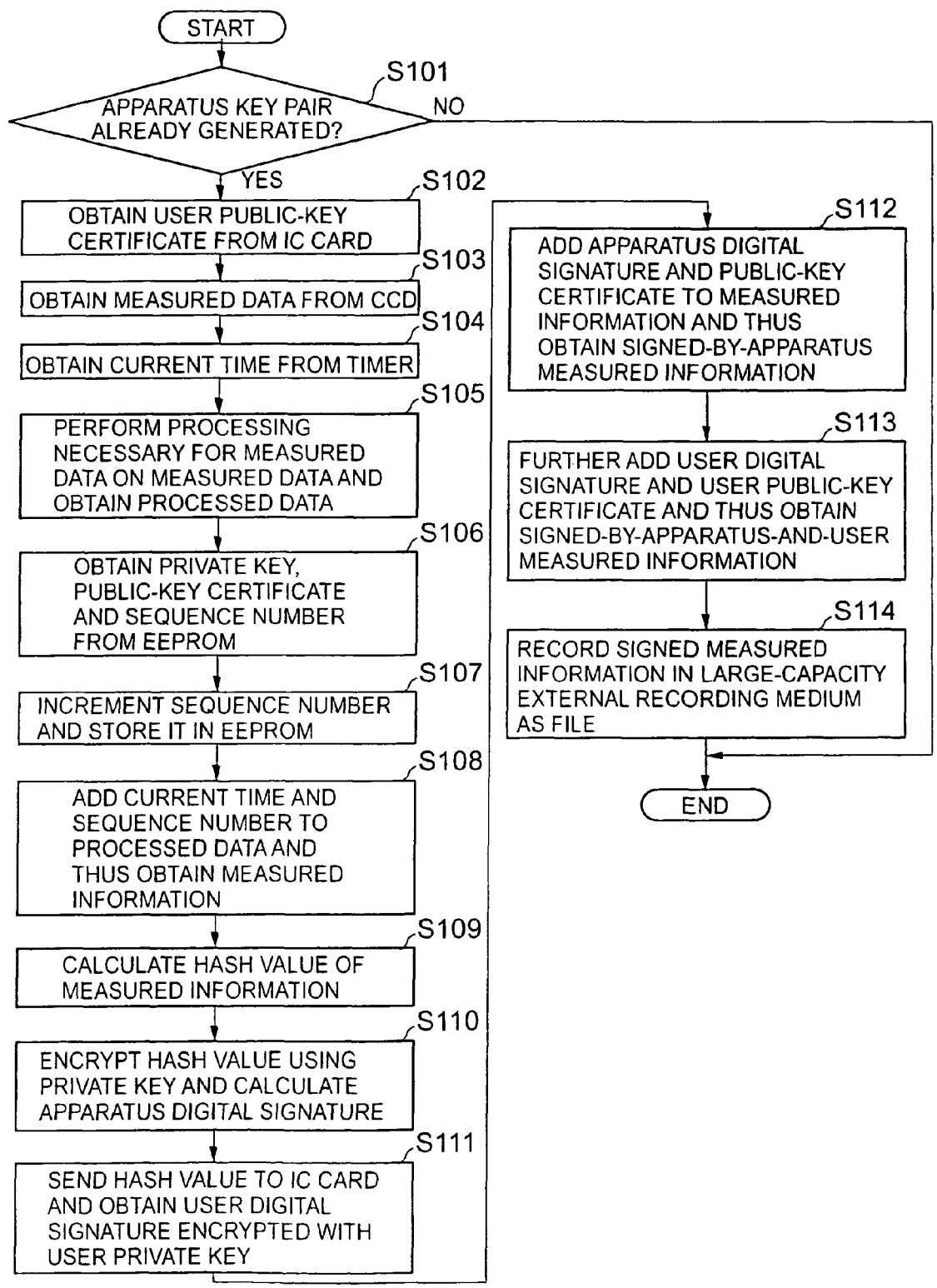
FIG. 2 is a flow chart showing a flow of processing performed on measured data, in the digital measurement apparatus in the first embodiment.

A flow of processing performed on measured data in the digital camera 1 in the first embodiment will now be described based on FIG. 2.

First, it is determined whether a key pair (a pair of the private key and public key) of the apparatus (digital camera 1) has been generated (in a step S101). When no key pair has been generated, the processing is finished. When the key pair has been generated, a user public-key certificate is obtained from the IC card 15 (which is not the IC card for storing images but is the IC card for user signing) shown in FIG. 1 (in a step S102). (It is noted that the IC card reader/writer 14 handles a plurality of IC cards at the same time.) Then, measured data (photograph data) is obtained from the CCD 20 (in a step S103), and the current time is obtained from the timer 18 (in a step S104). Then, processing (compression processing, CT reconstructing processing, conversion into a standard data format, and/or the like) which needs to be performed on the measured data is performed on the measured data. Then, the thus-processed measured data is obtained (in a step S105). Then, the private key, public-key certificate and sequence number are obtained from the EEPROM 13 (in a step S106). Then, the thus-obtained sequence number is incremented by 1, and, then, is stored in the EEPROM 13 (in a step S107). The current time and sequence number are added to the processed measured data, and the thus-obtained data is referred to as measured information (in a step S108). A hash value of the obtained measured information is calculated (in a step S109). The calculated hash value is encrypted using the private key, and, thus, the digital signature of the apparatus (digital camera 1) is calculated (in a step S110). The above-mentioned calculated hash value is sent to the IC card 15 (which is the IC card for user signing), and a user digital signature, obtained through encryption performed on the above-mentioned hash value using a private key of the user, is obtained (in a step S111). The digital signature of the apparatus and the public-key certificate are added to the measured information and the thus-obtained information is referred to as signed-by-apparatus measured information (in a step S112). Then, the user digital signature and user public-key certificate are added to the signed-by-apparatus measured information and the thus-obtained information is referred to as signed-by-apparatus-and-user measured information (in a step S113). The thus-completed signed measured information is recorded in a large-capacity external recording medium (in this embodiment, the IC card 15 (which is the IC card for storing images)) as a file (or is sent to the external apparatus 17 via the communication port 16) (in a step S114).

Thus, the user digital signature is generated using the external device such as the IC card (which is the IC card for user signing) or the like which has a cipher processing function, and the thus-generated signature is provided to the signed-by-apparatus measured information together with the user public-key certificate. Although, the measurement apparatus (digital camera 1) itself did not perform authentication of the user, it is possible to authenticate 'later' who is the user by inspecting the signed measured information. On the other hand, another method may be used, in which method the measurement apparatus itself can previously authenticate the user. In this case, it is possible that merely the user name is provided to the processed measured data together with the sequence number, and the digital-signature processing is performed on the thus-obtained data, only. It is supposed that the serial number, the name of the manufacturer and so forth of the apparatus are recorded in the public-key certificate of the apparatus, and the user name, the position of the user, and so forth, by which the user can be identified, are recorded in the user public-key certificate. The public-key certificate of the apparatus can be sent externally in response to an external request. Further, the digital signature is produced soon after the measured information is produced, in the first embodiment. However, because a calculation time is required for the production of the digital signature, a problem may arise in a case where continuous measurement is performed. Therefore, it is also possible for the produced measured information to be recorded in the large-capacity external recording medium as it is, and, then, before the measured information is sent externally, or before the large-capacity external recording medium is removed from the measurement apparatus, for the digital signature to be produced and provided to the measured information. In this case, it is necessary to disable the external apparatus from accessing the measured information to which the digital signature has not yet been provided, by a measure such as that in which the large-capacity external recording medium cannot be removed from the measurement apparatus until the digital signature is provided to the measured information.

Figure 3:
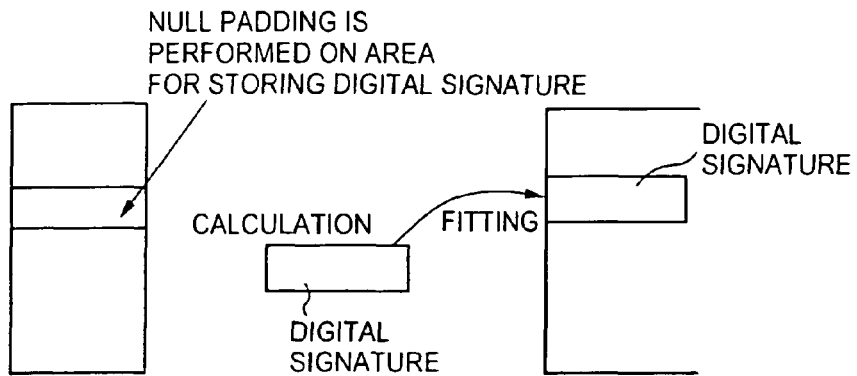
FIG. 3 shows a manner of storage of a digital signature, in the digital measurement apparatus in the first embodiment.

Further, in the first embodiment, appurtenant information (the current time, sequence number, public-key certificate and so forth) is merely added to the end of the processed measured data. However, for example, in a case of a JPEG image, the image-data format is such that arbitrary data can be embedded in a portion of the JPEG image data. Therefore, it is possible to record the above-mentioned appurtenant information using this portion. Thereby, even after the digital signature is embedded in the file of image data, an existing image display program can process the file of image data. To be noted in this case is that, in a case of TIFF (Tagged Image File Format) or the like, because the file of image data has, as a tag, information of the absolute position from which the image data starts, the absolute position shifts when the digital signature is embedded in the file of image data. In order to avoid such a problematic situation, as shown in FIG. 3, it is possible that an area for embedding the digital signature is previously secured in the file of image data, this area is previously filled with predetermined values, a hash value of the entire data is calculated, the digital signature is produced, and, then, the produced digital signature is embedded in the previously secured area.

Before performing data measurement, it is necessary to perform key-pair generating processing previously. This processing is performed by the manufacturer of the measurement apparatus in a factory before shipment of the measurement apparatus, for example.

Figure 4:
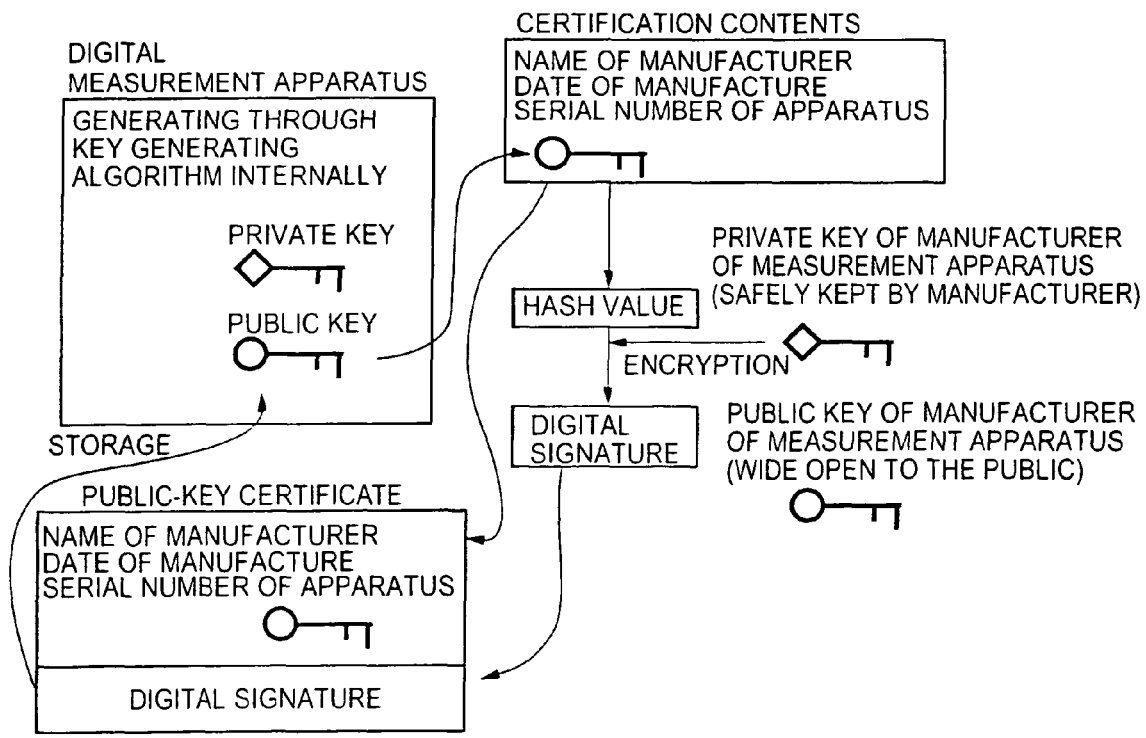
FIG. 4 shows a manner of key-pair generating processing, in the digital measurement apparatus in the first embodiment.
Figure 5:
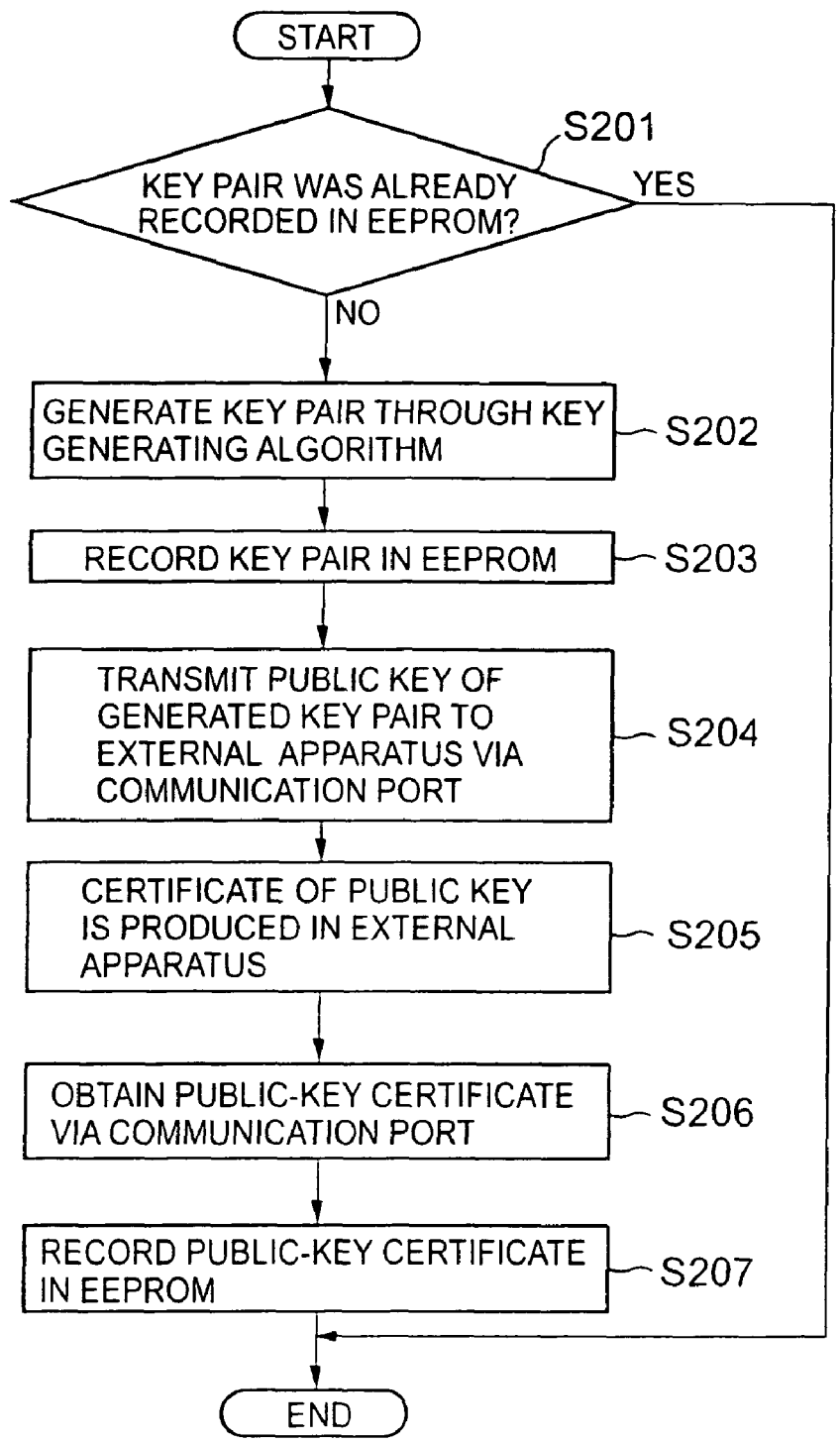
FIG. 5 is a flow chart showing a flow of the key-pair generating processing, in the digital measurement apparatus in the first embodiment.

The key-pair generating processing will now be described based on FIGS. 4 and 5. It is determined whether the key pair has already been recorded in the EEPROM of the measurement apparatus (in a step S201). When the key pair has already been recorded, it is not necessary to generate it. Therefore, the processing is finished. On the other hand, when the key pair has not been recorded, the key pair is generated through a key-generating algorithm, as shown in FIG. 4 (in a step S202). Then, the thus-generated key pair is recorded in the EEPROM 13 (in a step S203). Then, the public key of the key pair is transmitted externally via the communication port 16 (in a step S204). As shown in FIG. 4, the public-key certificate is produced for this public key in the external apparatus 17 (in a step S205), and this public-key certificate is sent to the digital measurement apparatus via the communication port 16 (in a step S206). Then, the public-key certificate is recorded in the EEPROM 13 of the measurement apparatus (in a step S207).

Figure 6:
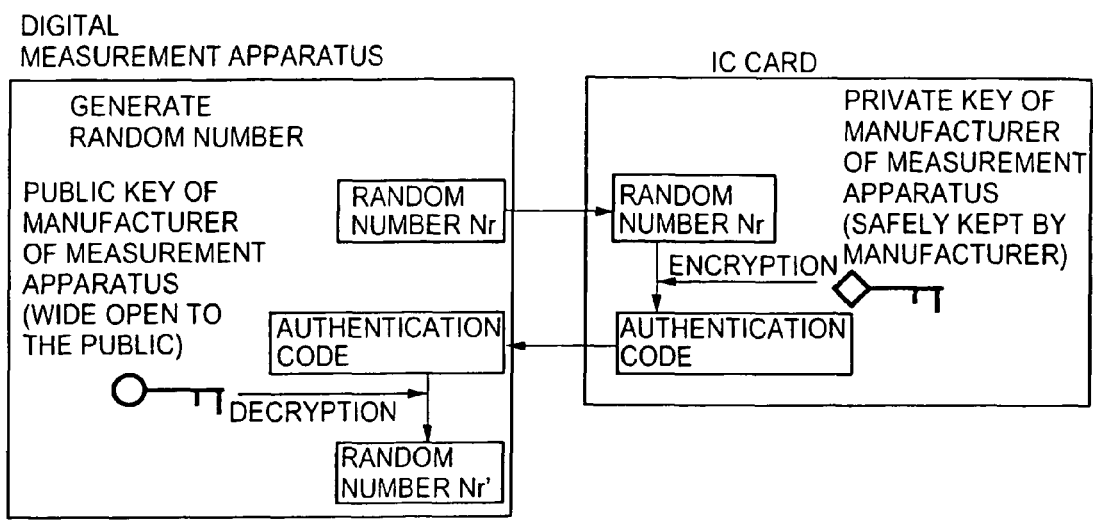
FIG. 6 shows a manner of external authentication, in the digital measurement apparatus in the first embodiment.

A simple example of processing of setting the internal timer of the measurement apparatus will now be described. A keypad is mounted on the measurement apparatus, a password is input through the keypad, and the measurement apparatus compares the inputted password with an internally held password. Then, when the result of the comparison is that both the passwords agree with one another, change of setting of the timer is allowed. Alternatively, as described above, because the measurement apparatus includes the IC-card reader/writer, it is possible for the setting of the timer to be changed only after a specific IC card (which is not an IC card for storing images but is an IC card for external authentication) is inserted. In order to verify that the inserted IC card is the specific IC card, the following method may be considered, for example: As shown in FIG. 6, the public key of the manufacturer of the measurement apparatus is previously stored inside of the measurement apparatus. Then, when a random number Nr, which is generated by the measurement apparatus first, agrees with a random number Nr' which is obtained as a result of an authentication code from the IC card being decrypted, it is determined that the IC card has the private key, and, thus, it is authenticated that the inserted IC card is the specific card.

Figure 7:
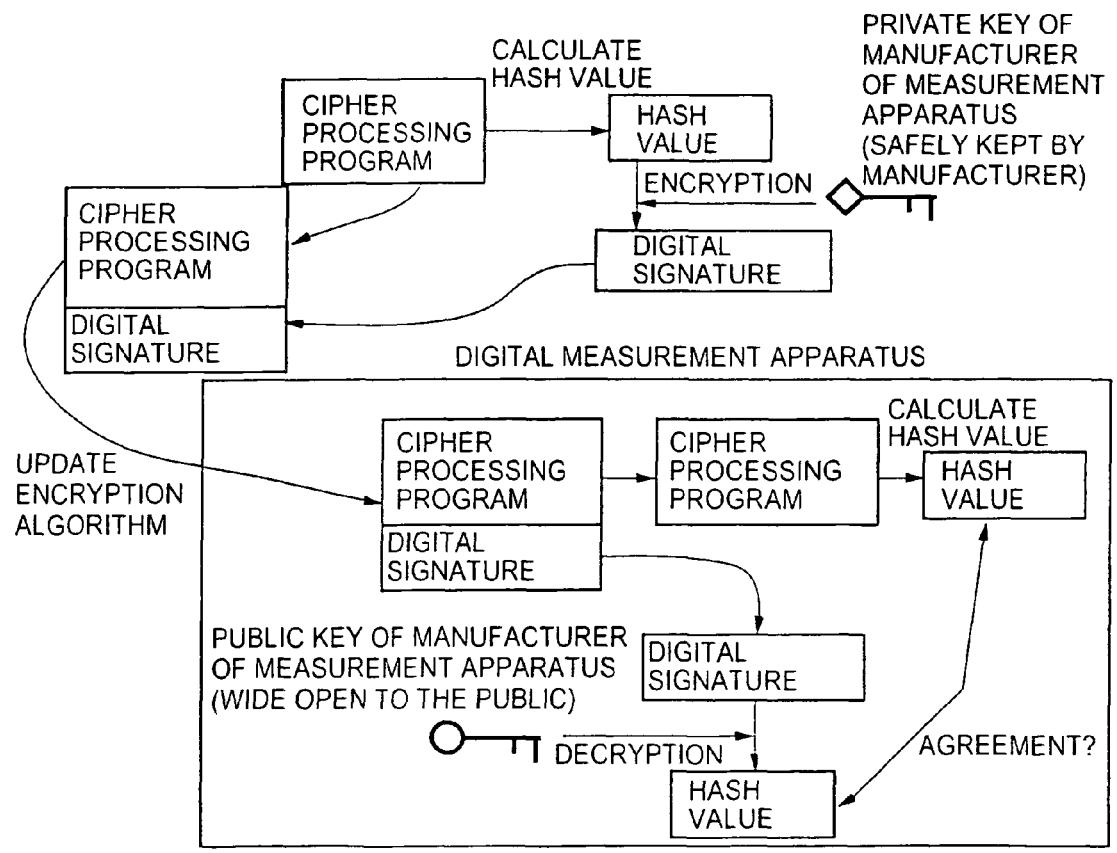
FIG. 7 shows a manner of encryption-algorithm updating processing, in the digital measurement apparatus in the first embodiment.

An example of processing of updating the encryption algorithm, which example is similar to the example described in the above description of the processing of changing the setting of the timer, will now be described. A method in which the measurement apparatus can receive a new encryption algorithm only after a specific IC card (which is an IC card for external authentication) is inserted may be considered. Further, the following method may also be considered: As shown in FIG. 7, after the digital signature of the manufacturer is provided to a cipher processing program, and, then, the cipher processing program is sent to the measurement apparatus together with the digital signature, the measurement apparatus verifies this digital signature. Then, when it can be verified that the digital signature is correct, the measurement apparatus stores the cipher processing program in the internal recording medium and uses the program for the cipher processing. Also in this example, it is supposed that the public key of the manufacturer is previously held in the measurement apparatus. The cipher-processing program includes an algorithm for calculating hash values, an algorithm for generating the key pair, an algorithm for performing encryption and an algorithm for performing decryption.

Figure 8:
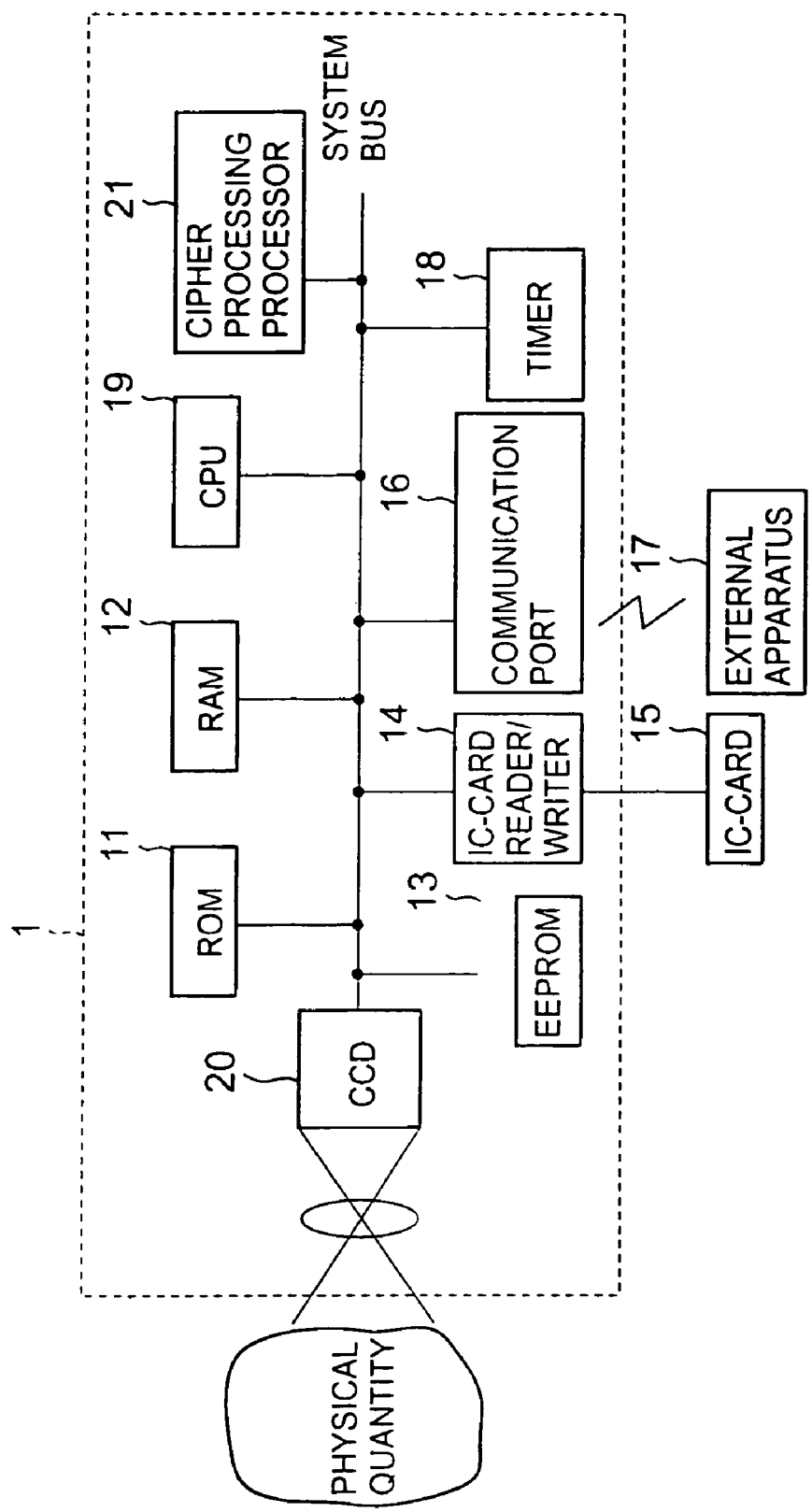
FIG. 8 is a block diagram showing an arrangement of an example in which a replaceable cipher processing processor is added.

Although the processing of updating the encryption algorithm has been described, it is also possible that only adding can be performed, instead of updating the encryption algorithm. In this case, the encryption algorithm to be additionally recorded should be one having a higher strength, that is, a possibility that a code generated using the encryption algorithm to be additionally recorded is deciphered dishonestly should be low. As a result of enabling only adding the new encryption algorithm to the existing one, it is possible to prevent the credibility of the measuring apparatus, in which the new encryption algorithm has been already loaded, from being degraded in a case where someone brings an old cipher processing program and dishonestly installs it into the measurement apparatus. Further, there is a large possibility that defects are found in the latest encryption algorithm in comparison to the case of the old encryption algorithm. Therefore, it is possible that both the digital signature generated using the old algorithm and the digital signature generated using the newly installed algorithm are provided to the measured information. Further, there is a large possibility that the new encryption algorithm needs a larger amount of calculation. Therefore, instead of replacement of the cipher-processing program, it is possible to replace the processor, which executes the cipher-processing program. In this case, it is necessary to authenticate whether the cipher-processing processor is one manufactured by the proper manufacturer. A method of this authentication may be completely the same as the above-described method by which it is authenticated whether the IC card (which is the IC card for external authentication) is the specific IC card (which is the IC card for external authentication). A form of the cipher-processing processor module may be such as a PCMCIA card, for example. Further, it is also possible to use a method in which the physical interface between the cipher-processing processor and the measurement apparatus is a special one which is not open to the public, or the protocol between the processor of the measurement apparatus and the cipher-processing processor is a special one which is not opened to the public. In such a case, it is not necessary to authenticate the cipher-processing processor. FIG. 8 shows an arrangement of the measurement apparatus 1 in a case where the processor (CPU 19) of the measurement apparatus and the cipher-processing processor 21 are separately provided, and a detailed description thereof is omitted.

Updating of the pair of the public key and private key is also possible. After the cipher processing algorithm is replaced with the new one or the new cipher processing algorithm is added to the digital measurement apparatus, the new key generating algorithm included in the new cipher processing program can be used. The operation of key-pair generation is that described above based on FIGS. 4 and 5. The actual key-pair generation can be performed when it is determined that the external authentication has been established. A method of the external authentication may be one of the methods described above in the description of change of the timer setting and updating of the encryption algorithm.

In the above-described first embodiment, a field for storing the digital signature is reserved in the measured data, and NULL padding is performed on the reserved field. The digital measurement apparatus calculates the digital signature for the entirety of the thus-obtained measured data. Then, the thus-calculated digital signature is stored in the above-mentioned reserved field. However, in this method, when it comes to be requested that other information such as comments, for example, be stored in the measured data after the digital signature is stored in the measured data, a problem arises. That is, when other attribute information is added to the measured data or attribute information is changed, the measured data itself becomes different data, even though the attribute information does not affect the credibility. Thereby, there is a possibility that verification of the measured data using the digital signature cannot be performed.

Therefore, in a second embodiment of the present invention, verification of the measured data is enabled even when other attribute information is added, as a result of it being made clear which information was used for calculating the digital signature.

Figure 9:
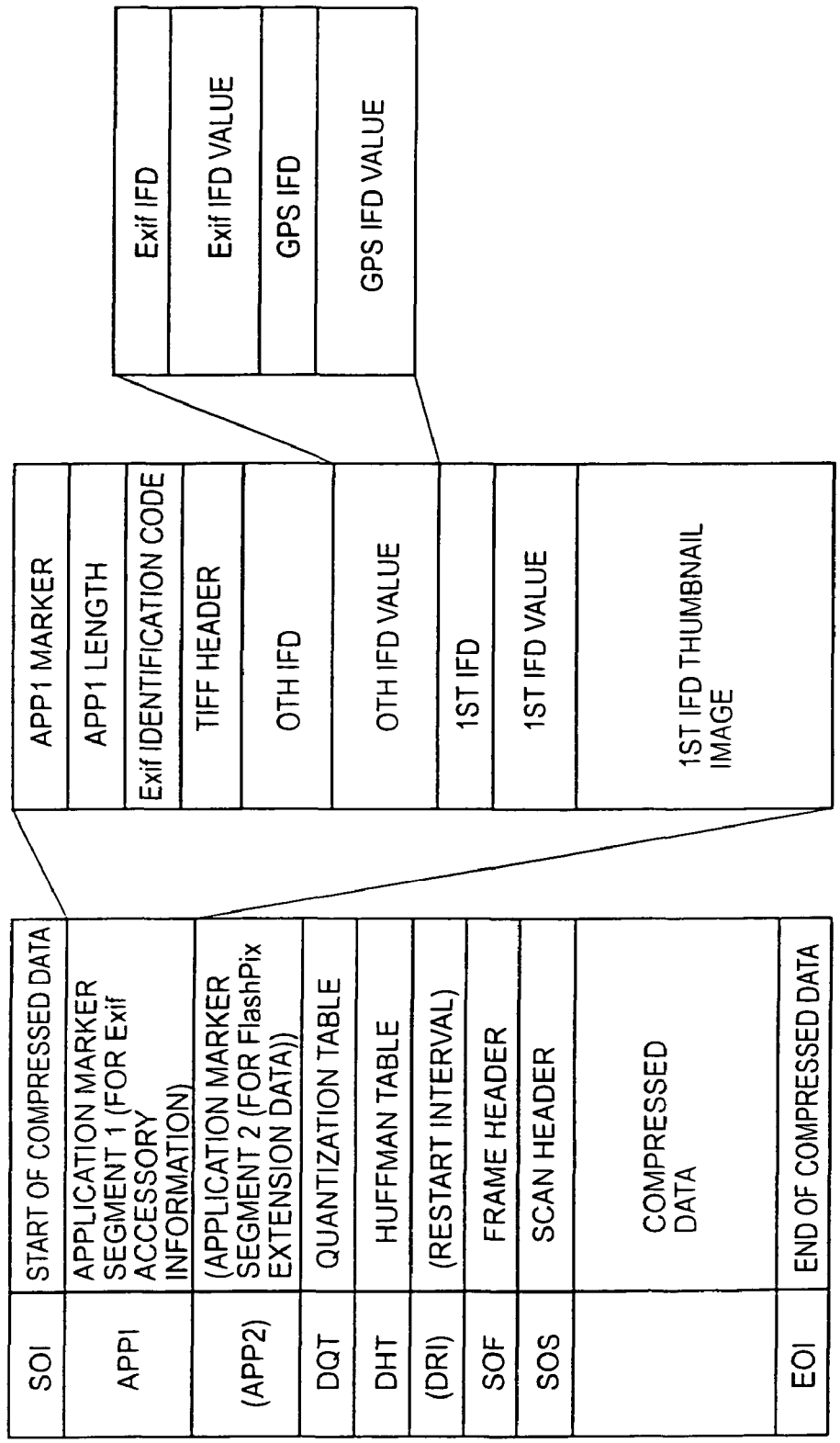
FIG. 9 shows the contents of an example of an image-data format.

The second embodiment will now be described using the image format of Exif (Exchangeable image file format for digital still camera) as an example. (The Exif standard was summarized by JEIDA (Japan Electronic Industry Development Association).) FIG. 9 shows the contents of the Exif image format. In the second embodiment, the digital signature and attribution information of the digital signature are stored in a security IFD which is a collection of tags for describing security information. The security IFD is defined independently in parallel with the Exif IFD in which information concerning image photographing conditions and the GPS IFD in which GPS information is described. In this case, the Exif IFD and GPS IFD include information which is used for improving the credibility of the measured data (digital photograph data in the case of the digital camera), such as measurement conditions, for example, the date and the place at which the photograph data was taken. Therefore, this information is required to be protected, from being altered, using the digital signature. Further, as a matter of course, the measured data body itself and information necessary for reproducing it are required to be protected. Specifically, the information starting from the DQT marker and ending before the EOI marker is required to be protected. Therefore, the matter that the digital signature is a digital signature for the Exif IFD, GPS IFD and information from the DQT marker to the EOI marker should be managed as attribution information of the digital signature. However, in accordance with the standard, comments can be recorded in the Exif IFD and GPS IFD. Therefore, when comments are added to the Exif IFD after the digital signature is provided, the authentication using the digital signature cannot be performed. In order to solve this problem, data used for calculating the digital signature is limited to only data which is needed for improving the credibility, and information for identifying the thus-limited data is recorded as attribute information of the digital signature.

Figure 10:
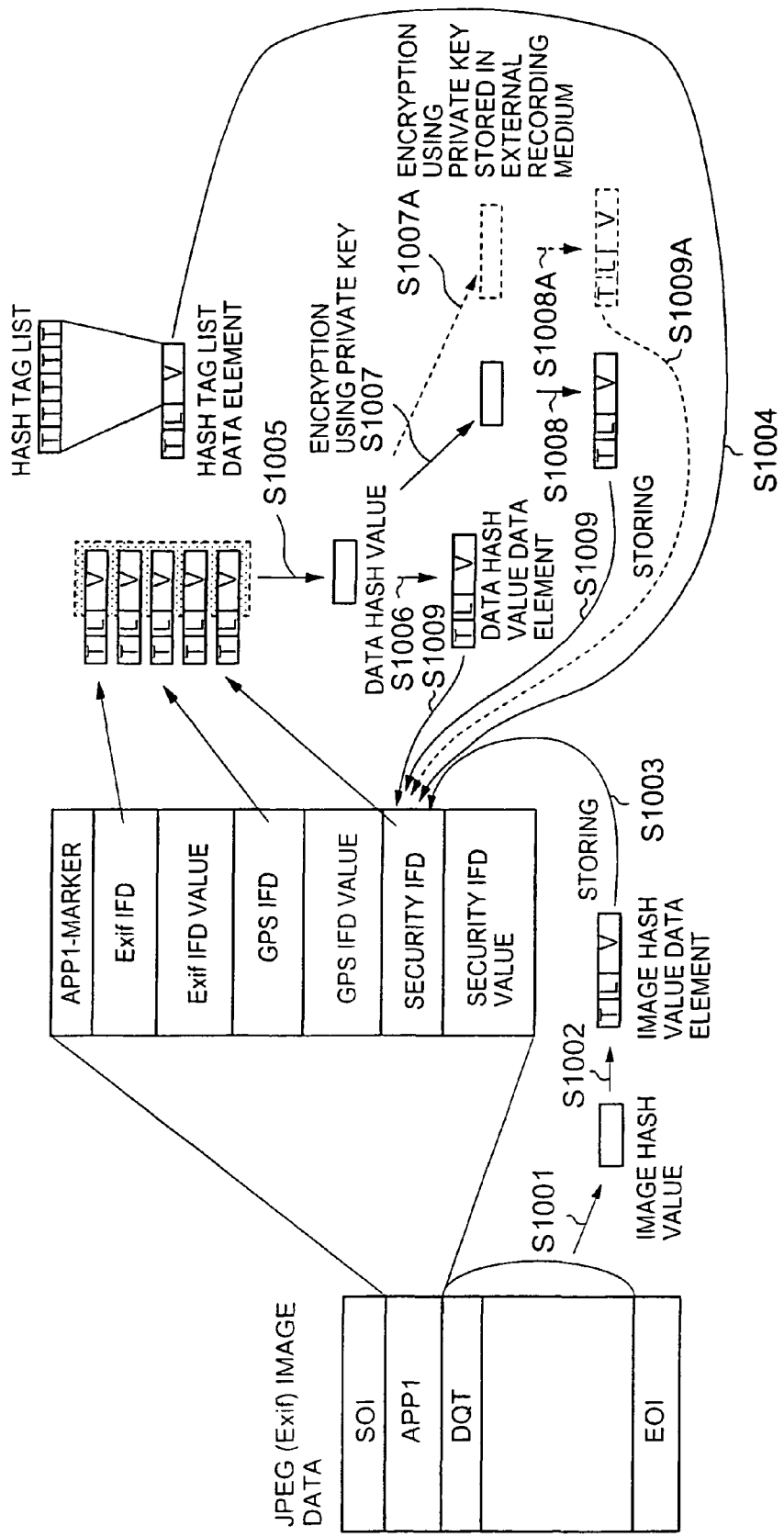
FIG. 10 shows a manner of a digital-signature storing processing procedure in an image measurement apparatus in a second embodiment of the present invention.

A processing procedure of providing the digital signature to a digital photograph image will now be described with reference to FIG. 10. It is supposed that the digital image has already been converted into the JPEG (Exif) format. (A hardware arrangement of the second embodiment may be the same as that of the first embodiment described above based on FIG. 1.)

(1) First, a hash value (characteristic quantity) of an image data stream (starting from the DQT marker and ending before the EOI marker) which is required to be protected (to be used as evidence) is calculated using a hash algorithm such as SHA-1 or MD5 (in a step of S1001). The thus-calculated value is called an image hash value.

(2) A TLV data element (consisting of a tag portion (represented by 'T' in the figure), a length portion (represented by 'L' in the figure) and a value portion (represented by 'V' in the figure)) is produced (in a step S1002), using a tag number (written in the tag portion 'T' of the TLV data element) indicating that this TLV data element is of the image hash value, which TLV data element includes the image hash value in the value portion of the TLV data element. The thus-produced TLV data element is called an image hash value data element.

(3) This image hash value data element is added to the security IFD that is newly, independently defined in the Exif format (in a step S1003).

(4) A list of tags of the data elements, included in the Exif IFD, GPS IFD and security IFD, which data elements are useful for improving the credibility of the digital image, is produced (in a step S1004). The thus-obtained list is called a hash tag list. A TLV data element is produced using a tag number (written in the tag portion 'T') indicating that this TLV data element is of the hash tag list. This TLV data element includes the hash tag list in the value portion thereof. The thus-produced TLV data element is called a hash tag list data element. This hash tag list data element is added to the security IFD in a step S1004. The above-mentioned hash tag list includes tags of a data element of the date and time at which the digital image was taken included in the Exif IFD, the image hash value element, a data element of the person who took the digital image, and so forth, included in the security IFD.

(5) The value in the value portion (or the value stored in another place in a case where the length of the value to be recorded in the value portion exceeds 4 bytes) of each data element, the tag of which is listed in the hash tag list, is compressed sequentially through a hash algorithm such as SHA-1 or MD5, and, thus, one hash value is calculated from the values of all the data elements, the tags of which are listed in the hash tag list (in a step S1005). The thus-calculated hash value is called a data hash value.

(6) A TLV data element is produced (in a step S1006) using a tag number (written in the tag portion 'T') indicating that this TLV data element is of the data hash value. This TLV data element includes the data hash value in the value portion thereof. The thus-produced TLV data element is called a data hash value data element.

(7) The above-mentioned data hash value is encrypted using the private key stored in the internal recording medium of the digital camera (in a step S1007). The code obtained through the encryption is called a data signature.

(8) A TLV data element is produced (in a step S1008) using a tag number (written in the tag portion 'T') indicating that this TLV data element is of the data signature. This TLV data element includes the data signature in the value portion thereof. The thus-produced TLV data element is called a data signature data element.

(9) The above-mentioned data hash value data element and data signature data element are added to the security IFD (in a step S1009).

(10) The thus-completed Exif image data is recorded in the large-capacity recording medium of the digital camera.

Further, it is also possible that, after the step S1007, the above-mentioned data hash value is also encrypted using the private key stored in the external recording medium loaded in the digital camera, in a step S1007A, then a TLV data element is produced for the thus-obtained code in a step S1008A (using a tag number indicating that this TLV data element is of the this code, and including this code in the value portion thereof), similar to and in addition to the above-mentioned data signature data element, after the step S1008, and, then, the thus-produced TLV data element is added to the security IFD in a step S1009A, after the step S1009A.

Further, it is also possible that a TLV data element is additionally produced for the sequence number of the image data (using a tag number indicating that this TLV data element is of the sequence number of the image data, and including the sequence number of the image data in the value portion thereof), a TLV data element is additionally produced for the serial number of the digital camera (using a tag number indicating that this TLV data element is of the serial number of the digital camera, and including the serial number of the digital camera in the value portion thereof), a TLV data element is additionally produced for the public key (using a tag number indicating that this TLV data element is of the public key, and including the public key in the value portion thereof), and a TLV data element is additionally produced for the public-key certificate (using a tag number indicating that this TLV data element is of the public-key certificate, and including the public-key certificate in the value portion thereof). In this case, the thus-produced data elements are added to the security IFD together with the image hash value data element (in the step S1004), the tags of these data elements are additionally included in the hash tag list, and the value in the value portion of each data element, the tag of which is listed in the hash tag list, is compressed sequentially through the hash algorithm, and, thus, one hash value is calculated from the values of all the data elements, the tags of which are listed in the hash tag list (in the step S1005). The thus-calculated hash value is called the data hash value. Then, the steps S1006, S1007, S1008 and S1009 are performed in sequence as described above using the thus-obtained data hash value. The above-mentioned public key is the companion to the private key used for encrypting the data hash value in the step S1007. The above-mentioned public-key certificate was produced for this public key as shown in FIG. 4, and includes this public key. The above-mentioned sequence number of the image data is the same as the sequence number used in the first embodiment. The above-mentioned serial number of the digital camera may be previously stored in the internal recording medium of the digital camera at a factory of the manufacturer of the digital camera. Instead, it is also possible that only any one or any ones of the above-mentioned data element(s) is (are) additionally produced, the thus-produced data element(s) is (are) added to the security IFD, the tag(s) of the data element(s) is (are) additionally included in the hash tag list, and the value in the value portion of each data element, the tag of which is listed in the hash tag list, is compressed sequen- tially through the hash algorithm, one hash value is thus calculated from the values of all the data elements, the tags of which are listed in the hash tag list (in the step S1005), the thus-calculated hash value is called the data hash value, and, then, the steps S1006, S1007, S1008 and S1009 are performed in sequence as described above using the thus-obtained data hash value.

Although not having been described in detail, similarly to the method of data description of the TIFF, in a case where the length of the value to be recorded in the value portion of the TLV data element exceeds 4 bytes (the length of the hash value being on the order of 8 bytes), an offset pointer which indicates another place is recorded in the value portion, and the value to be recorded in the value portion is recorded in the other place.

The integrity of the thus-produced digital-signature-provided image data of the digital camera is verified through the following processing procedure:

First, the value in the value portion of the data signature data element is read from the JPEG (Exif) image data. Then, the thus-obtained data signature is decrypted using the public key of the digital camera. Thereby, the data hash value is obtained. The thus-obtained data hash value will be referred to as a data hash value for verification. The value in the value portion of the data hash value data element is read from the JPEG (Exif) image data. Then, it is determined whether the thus-obtained data hash value agrees with the above-mentioned data hash value for verification. When they do not agree with one another, it is determined that the image data was altered in some way. The value in the value portion of the hash tag list data element is read from the JPEG (Exif) image data. Thus, the hash tag list is obtained. The values in the value portions of the data elements corresponding to the tags recorded in the hash tag list are read sequentially. The thus-read values are compressed through the hash algorithm so that the hash value is calculated. The thus-recalculated hash value is compared with the above-mentioned data hash value read from the value portion of the data hash value data element so that it is determined whether these hash values agree with one another. When these hash values do not agree with one another, it is determined that the image data was altered in some way. The value in the value portion of the image hash value data element is read. The thus-obtained image hash value will be referred to as an image hash value for verification. The protected image data stream is read from the JPEG (Exif) image data, and is compressed through the hash algorithm (SHA-1, MD5, or the like). Thus, the hash value is calculated. The thus-calculated hash value is compared with the above-mentioned image hash value for verification so that it is determined whether these hash values agree with one another. When these hash values do not agree with one another, it is determined that the image data was altered in some way. When it has not been determined that the image data was altered in some way, through the above-described processing, the image data was not altered (there is a very little possibility that the image data was altered). Therefore, it can be determined that the integrity of the image data has been secured.

In the above-described processing, the processing procedure of embedding the digital signature is reversely performed. However, alternatively, it is also possible to perform the same procedure as that of embedding the digital signature and obtain the hash values and so forth, then, finally, instead of encrypting the thus-obtained data hash value (referred to as a data hash value for verification) using the private key, reversely, decrypting the data signature embedded in the image data using the public key, and comparing the thus-obtained data hash value with the above-mentioned data hash value for verification.

The above-described embodiments have been described as the digital cameras, for example. However, the present invention can also be applied to any of image data optically read through an image reading unit such as a scanner and image data obtained through an image processing apparatus such as image data received through a facsimile machine or the like.

Further, the present invention is not limited to the above-described embodiments and variations and modifications may be made without departing from the scope of the present invention.

The present application is based on Japanese priority application Nos. 10-326215 and 11-205709, filed on Nov. 17, 1998 and Jul. 21, 1999, respectively, the entire contents of which are hereby incorporated by reference.

With regard to the public-key cryptography, see 'Answer to Frequently Asked Questions About Today's Cryptography' version 3, edited by the RSA Laboratories, 100 Marine Parkway, Suite 500, Redwood City, Calif. 94065-1031 USA, the entire contents of which are hereby incorporated by reference.

What is claimed is:

1. An apparatus, which provides a public-key cryptography digital signature for an image data, said apparatus comprising:
    a storage unit configured to store a private key of the apparatus;
    a signature calculating unit configured to calculate an apparatus public-key cryptography digital signature from a portion of image appurtenant information including a part of a characteristic quantity of the image data using the private key of the apparatus;
    a signature adding unit configured to add the apparatus public-key cryptography digital signature to the image appurtenant information in the image-data format; and
    a data handling unit configured to calculate a characteristic quantity of the image appurtenant information including the characteristic quantity of the image, configured to store the characteristic quantity as the image appurtenant information in the image data format, configured to calculate a user digital signature from said calculated characteristic quantity using a private key of a user of the apparatus, which is stored in an external storing unit loaded in said apparatus, and configured to store the user digital signature and the apparatus digital signature as the image appurtenant information in the image-data format.

2. The apparatus of claim 1, wherein the private key of the user used to calculate the public-key cryptography digital signature is stored in the external storing unit configured to make the user public-key cryptography digital signature.

3. The apparatus of claim 1, wherein the characteristic quantity stored in the image data format is given to the external storing unit loaded in the apparatus, and the user digital signature is calculated by the external storing unit from the image appurtenant information using the private key of the user of the apparatus stored in the external storing unit.

4. The apparatus of claim 1, wherein the image appurtenant information used for calculating the characteristic quantity used for calculating the apparatus digital signature includes a sequence number for each image data.

5. The apparatus of claim 1, wherein the portion of the image appurtenant information used for calculating the apparatus digital signature is stored in the image-data format as the image appurtenant information.

6. The apparatus of claim 1, wherein the image appurtenant information used for calculating the characteristic quantity used for calculating the apparatus digital signature includes a serial number.

7. The apparatus of claim 1, wherein the image appurtenant information used for calculating the characteristic quantity used for calculating the apparatus digital signature includes a public key which is a companion to the private key of the apparatus used for calculating the apparatus digital signature.

8. The apparatus of claim 1, wherein the image appurtenant information used for calculating the characteristic quantity used for calculating the apparatus digital signature includes a public key, in a form of a public key certificate, and the public key is a companion to the private key of the apparatus used for calculating the apparatus digital signature.

9. A method of providing a public-key cryptography digital signature for a measured image data measured by an apparatus, said method comprising:
    storing a private key of a user of the apparatus in an external storing unit;
    storing a private key of the apparatus;
    calculating a characteristic quantity of the measured image data;
    storing the characteristic quantity as image appurtenant information in the image data format;
    calculating, using the stored private key of the apparatus, an apparatus public-key cryptography digital signature from a portion of the image appurtenant information that includes the characteristic quantity of the measured image data;
    adding the apparatus public-key cryptography digital signature to the image appurtenant information in the image-data format;
    calculating a user digital signature from said calculated characteristic quantity using the stored private key of the user of the apparatus; and
    storing the user digital signature and the apparatus digital signature as the image appurtenant information in the image data format.

10. The method of claim 9, wherein the storing further comprises:
    generating the private key of the user in the external storing unit.

11. The method of claim 9, further comprising:
    adding the characteristic quantity stored in the image data format to the external storing unit loaded in the apparatus; and
    calculating the user digital signature by the external storing unit based on the image appurtenant information and using the private key of the user of the apparatus stored in the external storing unit.

12. The method of claim 9, further comprising:
    calculating the apparatus digital signature based on the image appurtenant information that includes a sequence number for each image data.

13. The method of claim 9, further comprising:
    calculating the apparatus digital signature based on the image appurtenant information that is stored in the image-data format as the image appurtenant information.

14. The method of claim 9, further comprising:
    calculating the apparatus digital signature based on the image appurtenant information that includes a serial number.

15. The method of claim 9, further comprising:
    calculating the apparatus digital signature based on the image appurtenant information that includes a public key which is a companion to the private key of the apparatus used for calculating the apparatus digital signature.

16. The method of claim 9, further comprising:
calculating the apparatus digital signature based on the image appurtenant information that includes a public key, in a form of a public key certificate, and the public key is a companion to the private key of the apparatus used for calculating the apparatus digital signature.

17. The apparatus of claim 1, wherein the data handling unit is further configured to transmit the calculated characteristic quantity to the external storing unit, and obtain the user digital signature calculated from the transmitted characteristic quantity with the use of the private key of the user by the external storing unit.

18. The method of claim 9, further comprising:
transmitting the calculated characteristic quantity from the data handling unit to the external storing unit; and
obtaining the user digital signature calculated from the transmitted characteristic quantity with the use of the private key of the user by the external storing unit.

19. The apparatus of claim 1, wherein the image data is an image data measured by the apparatus.

* * * * *